US011391902B2

(12) United States Patent
Chiasson et al.

(10) Patent No.: US 11,391,902 B2
(45) Date of Patent: Jul. 19, 2022

(54) OPTICAL RIBBON WITH PRINTING BETWEEN OPAQUE PRIMARY LAYER AND COLORED SECONDARY LAYER

(71) Applicant: CORNING RESEARCH & DEVELOPMENT CORPORATION, Corning, NY (US)

(72) Inventors: David Wesley Chiasson, Edmonton (CA); Ching-Kee Chien, Horseheads, NY (US); Gregory Alan Mills, Clemmons, NC (US)

(73) Assignee: CORNING RESEARCH & DEVELOPMENT CORPORATION, Corning, NY (US)

(*) Notice: Subject to any disclaimer, the term of this patent is extended or adjusted under 35 U.S.C. 154(b) by 0 days.

(21) Appl. No.: 17/176,704

(22) Filed: Feb. 16, 2021

(65) Prior Publication Data

US 2021/0165180 A1 Jun. 3, 2021

Related U.S. Application Data

(63) Continuation of application No. PCT/US2019/047070, filed on Aug. 19, 2019.

(60) Provisional application No. 62/720,196, filed on Aug. 21, 2018.

(51) Int. Cl.
*G02B 6/44* (2006.01)

(52) U.S. Cl.
CPC .......... *G02B 6/447* (2013.01); *G02B 6/4482* (2013.01)

(58) Field of Classification Search
CPC .............................. G02B 6/447; G02B 6/4482
See application file for complete search history.

(56) References Cited

U.S. PATENT DOCUMENTS 5,074,643 A 12/1991 Petisce
5,615,030 A 3/1997 Harada et al.
5,809,195 A 9/1998 Brown et al.
5,933,559 A 8/1999 Petisce
6,195,491 B1 2/2001 Jackson et al.
6,323,255 B1 11/2001 Snowwhite
(Continued)

OTHER PUBLICATIONS

International Search Report and Written Opinion of the International Searching Authority; PCT/US19/47070; dated Oct. 24, 2019; 10 Pages; Commissioner for Patents.

*Primary Examiner* — Sung H Pak
*Assistant Examiner* — Hoang Q Tran
(74) *Attorney, Agent, or Firm* — William D. Doyle

(57) ABSTRACT

Disclosed here are embodiments of an optical fiber ribbon. In the optical fiber ribbon, a plurality of optical fibers are arranged in a row. The optical fibers are embedded in a primary matrix. The primary matrix comprises a base resin and an opacifier pigment. A secondary matrix is disposed around the primary matrix, and a layer of printing is disposed between the primary matrix and the secondary matrix. The secondary matrix has a contrast ratio of from 0.2 to 0.9 as measured according to ASTM D2805. Embodiments of a method of preparing an optical fiber ribbon are also disclosed in which optical fibers are arranged in a row and embedded in a primary matrix. Characteristics of the optical fibers is printed onto the primary matrix, and the primary matrix is coated with a secondary matrix having a contrast ratio of from 0.2 to 0.9 according to ASTM D2805.

20 Claims, 2 Drawing Sheets

10
18
16
12
14

(56) References Cited

U.S. PATENT DOCUMENTS

| | | | | |
|---|---|---|---|---|
| 6,370,304 | B1 | 4/2002 | Mills et al. | |
| 6,381,390 | B1 | 4/2002 | Hutton et al. | |
| 6,483,972 | B1 | 11/2002 | Thompson et al. | |
| 6,498,883 | B1 | 12/2002 | Wilson | |
| 6,504,982 | B1 | 1/2003 | Greer | |
| 6,532,329 | B1 | 3/2003 | Thompson | |
| 6,600,859 | B2 | 7/2003 | Chandraiah et al. | |
| 6,678,449 | B2 | 1/2004 | Thompson et al. | |
| 6,714,712 | B2 | 3/2004 | Bishop et al. | |
| 6,731,844 | B2 | 5/2004 | Conrad et al. | |
| 6,775,451 | B1 | 8/2004 | Botelho et al. | |
| 7,052,734 | B2 | 5/2006 | Strait | |
| 7,257,299 | B2 | 8/2007 | Chien et al. | |
| 7,414,081 | B2 | 8/2008 | Greer et al. | |
| 9,513,449 | B2 | 12/2016 | Blazer et al. | |
| 2001/0024698 | A1 | 9/2001 | Lin et al. | |
| 2002/0067900 | A1 * | 6/2002 | Mills .................... | G02B 6/4482 385/114 |
| 2007/0238801 | A1 | 10/2007 | Chien et al. | |

* cited by examiner

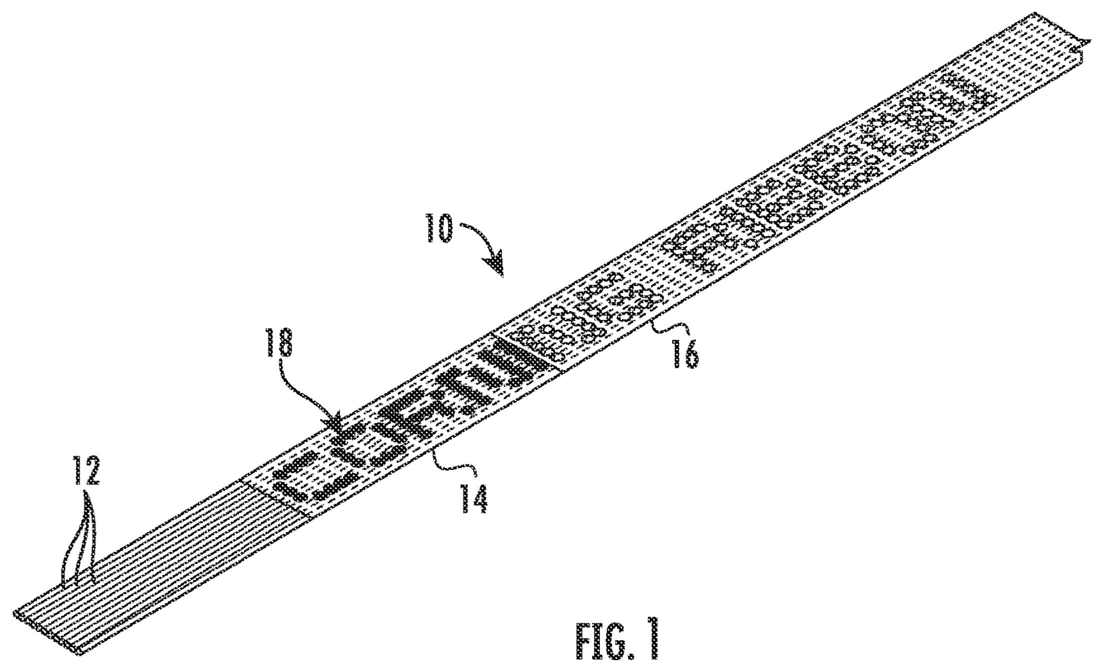
FIG. 1
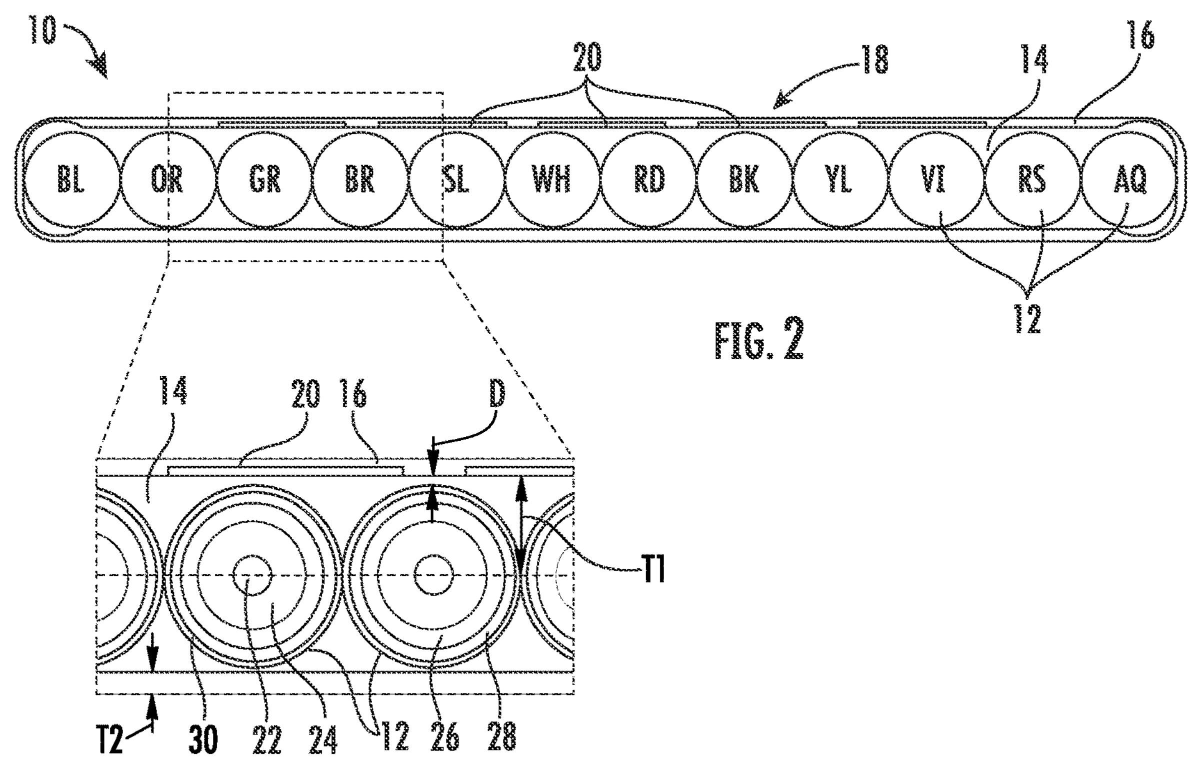
FIG. 2
FIG. 3

OPTICAL RIBBON WITH PRINTING BETWEEN OPAQUE PRIMARY LAYER AND COLORED SECONDARY LAYER

CROSS-REFERENCE TO RELATED APPLICATIONS

This application is a continuation of International Application No. PCT/US2019/047070 filed Aug. 19, 2019, which claims the benefit of priority to U.S. Provisional Application No. 62/720,196, filed on Aug. 21, 2018, which is incorporated herein by reference.

BACKGROUND

The disclosure relates generally to optical fibers, and specifically to optical fiber ribbons having a two layer coating with printing between the layers. A single optical fiber cable many contain many optical fibers (indeed, hundreds of optical fibers), and during installation of a fiber optic cable network, managing the connections between the optical fibers can be difficult. Thus, various portions of the optical fiber cable, such as individual optical fibers, buffer tubes, or ribbons, may be color coded for the purposes of identification when making such connections.

SUMMARY

One embodiment of the disclosure relates to embodiments of an optical fiber ribbon. The optical fiber ribbon includes a plurality of optical fibers arranged in a row. The plurality of optical fibers are embedded into a primary matrix. The primary matrix comprises a base resin and an opacifier pigment. A secondary matrix is disposed around the primary matrix. A layer of printing is disposed between the primary matrix and the secondary matrix. The secondary matrix has a contrast ratio of from 0.2 to 0.9 as measured according to ASTM D2805.

An additional embodiment of the disclosure relates to embodiments of a method of preparing an optical fiber ribbon. In the method, a plurality of optical fibers are arranged in a row. The plurality of optical fibers are embedded into a primary matrix. The primary matrix comprises a base resin and an opacifier pigment. Information regarding characteristics of the optical fiber ribbon are printed onto the primary matrix. The primary matrix is then coated with a secondary matrix. The secondary matrix comprises a contrast ratio of from 0.2 to 0.9 as measured according to ASTM D2805.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

BRIEF DESCRIPTION OF THE DRAWINGS

FIG. 1 is a perspective view of an optical fiber ribbon, according to an exemplary embodiment.

FIG. 2 is a cross-sectional view of the optical fiber ribbon of FIG. 1, according to an exemplary embodiment.

FIG. 3 is a close-up view of a portion of the cross-section of FIG. 2, according to an exemplary embodiment.

DETAILED DESCRIPTION

Figure 4:
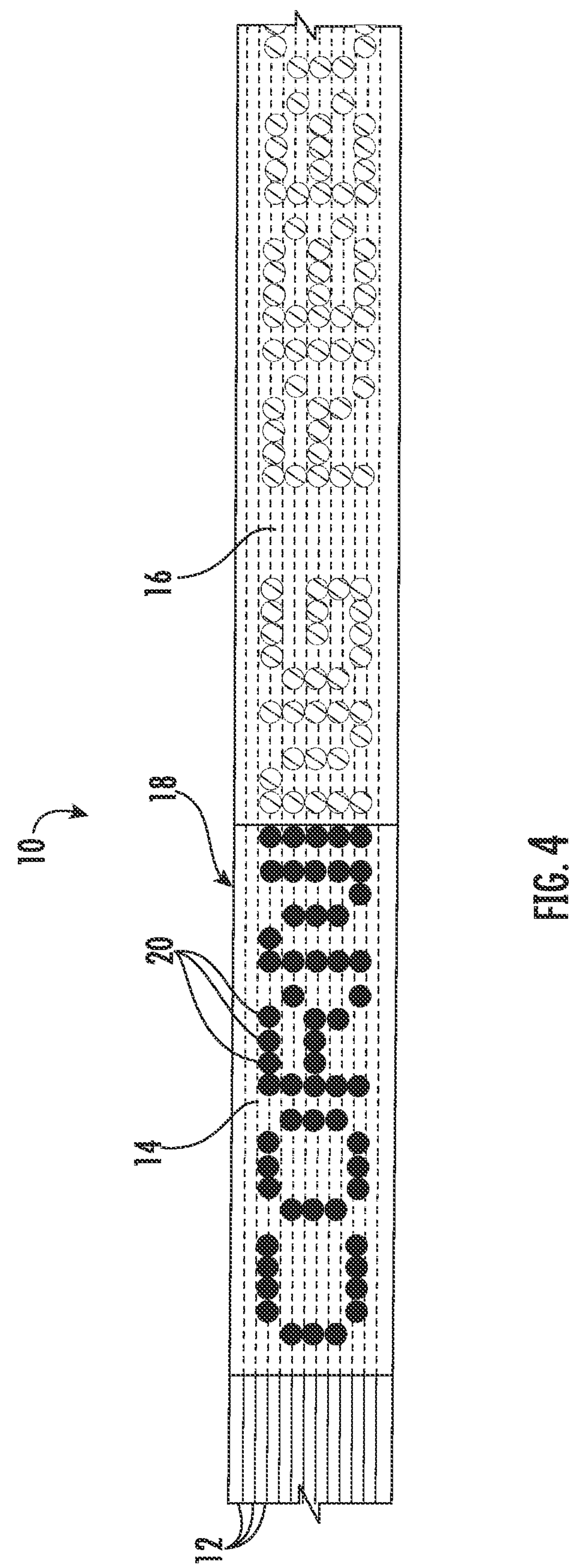
FIG. 4 is top view of the optical fiber ribbon of FIG. 1, according to an exemplary embodiment.

Referring generally to the figures, various embodiments of an optical fiber ribbon having an opacifying primary matrix, a colored secondary matrix, and printing between the primary matrix and the secondary matrix are provided. As will be discussed more fully below, the opacifying primary matrix reduces an intensity of colors of optical fibers embedded in the primary matrix. In this way, the primary matrix provides a high contrast background, which allows the printing to be more easily discerned. Additionally, the secondary matrix provides a color-tinted outer layer for identification purposes without obscuring the underlying printing. In this way, the printing can be protected from abrasion by the secondary matrix while remaining legible for cable installers, technicians, and other handlers. In essence, the optical fiber ribbons according to the present disclosure achieve the goal of providing clearly discernable identification information by separating the functions of opacity and color between the primary matrix and the secondary matrix, respectively.

In contrast to some designs that include opacifiers and colorants in the same matrix layer, the designs discussed herein have separate matrix layers for opacifiers and colorants with printing disposed between these matrix layers. Thus, the opacifying primary matrix does not include a colorant. Applicant has found that a ribbon with printing between an underlying opacifying primary matrix layer and an overlying colorant secondary matrix layer maintain the legibility of the printing better than a ribbon with opacifiers and colorants included in the same layer. These and other aspects and advantages will be discussed in relation to the embodiments provided below. These embodiments are provided by way of illustration and not by way of limitation.

FIG. 1 depicts an exemplary embodiment of an optical fiber ribbon 10 according to the disclosure. The optical fiber ribbon 10 includes a plurality of optical fibers 12 arranged in a substantially planar row. The number of optical fibers 12 contained in the row varies by embodiment. In embodiments, the number of optical fibers 12 in a row is from four to thirty-six. In certain embodiments, the optical fibers 12 in the ribbon 10 may be divided into subunits of, e.g., four, eight, or twelve fibers 12. In the optical fiber ribbon, the optical fibers 12 are embedded in a primary matrix 14. The primary matrix 14 holds the plurality of optical fibers 12 such that they are substantially parallel, adjacent, and are disposed, at least at a given cross section of the optical fiber ribbon 10, in substantially the same plane. In embodiments, the longitudinal axis of each optical fiber 12 is substantially parallel to and coplanar with its adjacent optical fiber 12. The primary matrix 14 is coated with a secondary matrix 16. Between the primary matrix 14 and the secondary matrix 16, the optical fiber ribbon 10 includes printing 18. The printing 18 includes information about the optical fiber ribbon 10, such as the fiber type, ribbon identification number, and/or other identification information. Advantageously, by placing the printing between the primary matrix 14 and the secondary matrix 16, the printing 18 is protected from accidental removal or abrasion, especially during installation, thereby preserving the legibility of the printing 18.

FIG. 2 depicts a cross section of the optical fiber ribbon 10 of FIG. 1. As can be seen, the optical fibers 12 are aligned in a row and embedded in the primary matrix 14. In embodiments, the individual optical fibers 12 within the optical fiber ribbon 10 are color coded as shown by the color abbreviations in FIG. 2. For example, the optical fibers 12 going from left to right are color coded as follows: BL—blue; OR—orange; GR—green; BR—brown; SL—slate; WH—white; RD—red; BK—black; YL—yellow; VI—violet; RS—rose; and AQ—aqua. In embodiments containing more than twelve optical fibers 12, the pattern of colors may be repeated. The optical fibers 12 are color coded in this way to help organize and identify specific fibers when making connections or splices. However, the color of the optical fibers 12 can make reading the printing 18 between the primary matrix 14 and the secondary matrix 16 difficult. In particular, the darker colored fibers 12 tend to limit the contrast between the ink of the printing and the background.

Thus, the primary matrix 14 includes an opacifier to create a contrasting background for the printing 18. In a particular embodiment, the primary matrix 14 includes a pigment, ink, dye, or other colorant as an opacifier. In embodiments, the pigment changes the color of the primary matrix 14 to white, gray, or black.

In terms of the CIE L*c*h* color space, using a white opacifier causes the lightness (L*) values for all of the optical fibers to increase, which makes the color whiter, and the saturation (chroma—c*) decreases, which decreases the intensity of the colors. The hue angle h* for the colors remains the same. By increasing lightness and decreasing chroma, the optical fibers 12 become less visible through the primary matrix 14. In this way, the printing 18 is able to contrast more with the underlying primary matrix 14.

As can be seen in FIG. 2, the printing 18 is comprised of a plurality of dots 20 of ink. In embodiments, the dots 20 are printed using inkjet printing on the primary matrix 14. In embodiments, the dots 20 have a first surface in contact with the outer surface of the primary matrix 14. Substantially all of the remaining surfaces of the dots 20 are in contact with the secondary matrix 16. In embodiments, the dots 20 are substantially circular and have a diameter of from 200 μm to 350 μm. In embodiments, the dots have a thickness of 0.5 μm to 2 μm. In embodiments, the color of the ink dots 20 is selected to provide good contrast with the color of the primary matrix 14. For example, when the primary matrix 14 is white, the ink dots 20 may be selected to be black. An example of a black ink suitable for use for the ink dots 20 is MB175 (available from Markem-Imaje, Switzerland). In another example, when the primary matrix 14 is black or gray, the ink dots 20 may be selected to be yellow. An example of a yellow ink suitable for use for the ink dots 20 is Yellow MC258 (available from Markem-Imaje, Switzerland). Other color combinations between the ink dots 20 and the primary matrix 14 are possible, and these examples are provided by way of illustration only and not by way of limitation.

FIG. 3 provides a close-up view of a portion of the optical fiber 10. In FIG. 3, the structure of the optical fibers 12 is depicted. The optical fibers 12 are comprised of a core 22 surrounded by a cladding 24. Optical signals are carried by the core 22, and the cladding 24 substantially prevents the optical signals from escaping the core 22 during transmission. In embodiments, the cladding 24 is coated with a primary coating 26 that is made of a relatively softer, cushioning material. The primary coating 26 is further coated with a secondary coating 28 that is made of a harder material to provide abrasion resistance. Disposed outside of the secondary coating 28 is a fiber jacket 30 that comprises, e.g., a dye, an ink, or a pigment that provides an identifying color for the fiber 12.

As can be seen in FIG. 3, the primary matrix 14 is provided above and below the optical fibers 12 as well as in the spaces between optical fibers 12. In embodiments, the optical fibers 12 are embedded in the primary matrix 14, which forms a continuous and contiguous layer of polymer material around the optical fibers 12. In embodiments, substantially all of the outer surface of the fiber jacket 30 contacts the primary matrix 14. The primary matrix 14 is the thinnest, thus having the lowest hiding power, at the tops and bottoms of the optical fibers 12. In embodiments, the distance D between the tops of the optical fibers 12 and the outer surface of the primary matrix 14 is from 5 μm to 15 μm. The thickness T1 (defined as the measurement from the center line of the ribbon to the outer surface of the primary matrix 14) of the primary matrix 14 is from 100 μm to 150 μm in embodiments. Thus, going from the side of the optical fiber 12 to the top of the optical fiber 12, the primary matrix 14 decreases in thickness, which lessens the hiding power going from the side to the top of the optical fiber 12. In terms of a continuous thickness profile, the thickness of the primary matrix 14 is at a maximum along the sides of the optical fibers 12 (i.e., thickness T1) and at a minimum at the tops of the optical fibers 12. On average, the minimum thickness (i.e., distance D) is from about 5 μm to about 15 μm. This allows the primary matrix to obscure a portion of the color of the fiber jacket 30 more than other portions while still allowing at least some visibility of the color of the underlying fiber jacket 30.

In order to provide a high level of hiding power (along with adequate mechanical properties), the primary matrix 14 is composed of a base resin having a pigment dispersed therein. In embodiments, the base resin is a polymer material that is curable. In a particular embodiment, the base resin is a UV-curable resin comprising an oligomer component, a reactive diluent monomer component, and a photoinitiator. In embodiments, the oligomer is one or more acrylated, methacrylated, or vinyl functional oligomer, and in embodiments, the oligomer has an aliphatic urethane or epoxy backbone. In embodiments, the oligomer comprises 30 wt % to about 80 wt % of the UV-curable resin. In embodiments, the reactive diluent monomer component is one or more reactive diluent monomers having 1 to 5 functional groups of, e.g., acrylate, methacrylate, vinyl ether, or vinyl. In embodiments, the reactive diluent monomer comprises 5 wt % to 65 wt % of the UV-curable resin. In embodiments, the photoinitiator comprises from 0.1 wt % to 10 wt % of the UV-curable resin. In embodiments, the UV-curable resin may also include a variety of other additives in an amount of 0 wt % to 10 wt %, such as antioxidants, catalysts, lubricants, low molecular weight non-crosslinking resins, adhesion promoters, and stabilizers. In embodiments, the base resin comprises from 85 wt % to 99 wt % of the primary matrix 14, and the pigment comprises the remaining 1 wt % to 15 wt % of the primary matrix 14.

In embodiments of the UV-curable resin, the oligomers may be based on an aliphatic polyether polyol, which is reacted with an aliphatic polyisocyanate and then acrylated. In embodiments, the photoinitiator may include at least one photoinitiating compound selected from the group consisting of bis-acyl phosphine oxide; hydroxycyclohexylphenyl ketone; hydroxymethylphenylpropanone; dimethoxyphenylacetophenone; 2-methyl-1,4-(methyl thio)phenyl-2-morpholino-propanone-1; 1-(4-isopropylphenyl)-2-hydroxy-2-methylpropan-1-one; 4-(2-hydroxyethyoxy)phenyl-(2-hydroxy-2-propyl)ketone; 1-(4-dodecyl phenyl)-2-hydroxy-2-methylpropan-1-one; diethoxyacetophenone; 2,2-di-sec-butoxy-acetophenone; diethoxyphenyl acetophenone; bis(2, 6-dimethoxybenzoyl)-2,4,4-trimethylpentylphosphine oxide; 2,4,6-trimethylbenzoyldiphenylphosphine oxide; 2,4, 6-trimethylbenzoylethoxyphenylphosphine oxide; and mixtures thereof.

Further, in embodiments, examples of suitable reactive diluent monomers include (but are not limited to) isobornyl acrylate; $C_6$-$C_{12}$ hydrocarbon diol diacrylates; $C_6$-$C_{12}$ hydrocarbon diol dimethacrylates; tripropylene glycol diacrylate; tripropylene glycol dimethacrylate; neopentyl glycol, diacrylate; neopentyl glycol dimethacrylate; neopentyl glycol propoxylate diacrylate; neopentyl glycol propoxylate dimethacrylate; neopentyl glycol ethoxylate diacrylate; neopentyl glycol ethoxylate dimethacrylate; bisphenol A ethoxylate diacrylate; bisphenol A ethoxylate dimethacrylate; bisphenol A propoxylate diacrylate; bisphenol A propoxylate dimethacrylate; phenoxyethyl acrylate; phenoxyethyl methacrylate; phenoxyethyl ethoxylate acrylate; phenoxyethyl ethoxylate methacrylate; phenoxyethyl propoxylate acrylate; phenoxyethyl propoxylate methacrylate; polyethylene glycol nonylphenylether acrylate; polyethylene glycol nonylphenylether methacrylate; polypropylene glycol nonylphenylether acrylate; polypropylene glycol nonylphenylether methacrylate; isooctyl methacrylate; octyl acrylate; octyl methacrylate; decyl acrylate; decyl methacrylate; isodecyl acrylate; isodecyl methacrylate; lauryl acrylate; lauryl methacrylate; tridecyl acrylate; tridecyl methacrylate; palmitic acrylate; palmitic methacrylate; stearyl acrylate; stearyl methacrylate; cetyl acrylate; cetyl methacrylate; tetrahydrofurfuryl acrylate; tetrahydrofurfuryl methacrylate; isobornyl acrylate; isobornyl methacrylate; dicyclopentenyl acrylate; dicyclopentenyl methacrylate; dicyclopentenyl ethoxylate acrylate; dicyclopentenyl ethoxylate methacrylate; dicyclopentenyl propoxylate acrylate; dicyclopentenyl propoxylate methacrylate; N-vinyl amides and mixtures thereof. Most preferred compounds include isobornyl acrylate, isocyanurate acrylate and particularly tris-hydroxyethyl isocyanurate triacrylate.

A variety of suitable pigments can be dispersed in the UV-base resin. For a white primary matrix 14, exemplary pigments include $TiO_2$, $BaSO_4$, ZnO or ZnS. For a black primary matrix 14, an exemplary pigment is carbon black. For a gray primary matrix 14, the pigment may be a combination of white and black pigments.

The secondary matrix 16 is applied to the outer surface of the primary matrix 14. As discussed above, the secondary matrix 16 is tinted with a colorant so as to provide an identification element to the optical fiber ribbon 10. However, the secondary matrix 16 is also configured to be semi-transparent such that the printing 18 can be seen beneath the secondary matrix 16. As considered herein, the level of transparency of the secondary matrix is selected so as to achieve a desired contrast ratio according to ASTM D2805 of the secondary matrix 16. As used herein, "contrast ratio" is defined as "the ratio of the reflectance of a film on a black substrate to that of an identical film on a white substrate." In performing a contrast ratio test according to ASTM D2805, the material tested is spread in an even layer over a test card having both a section of white background and a section of black background. Using reflectometry, the reflectance over the white section and the black section is measured. The ratio of these reflectances is the contrast ratio.

The contrast ratio can be adjusted by varying the amount of colorant (e.g., dye, pigment, ink, etc.) used in the composition of the secondary matrix 16 and by varying the thickness of the secondary matrix 16. For example, for a given composition, the contrast ratio of the secondary matrix 16 will increase as the thickness of the secondary matrix 16 increases. Additionally, for a given thickness, the contrast ratio of the secondary matrix 16 will increase as the amount of colorant pigment in the composition of the secondary matrix 16 increases. Table 1 provides the colors of the secondary matrix 16 as defined according the CIE L*c*h* color space, and Table 2 provides the contrast ratio ranges to achieve the desired level of transparency to be able to clearly discern the printing 18 beneath the secondary matrix 16 while still being able to identify the color of the ribbon 10.

TABLE 1

Secondary Matrix Color (>100 μm on White Background)

| Secondary Color | Lightness (L*) | Chroma (C*) (Full saturation) | Hue Angle (h*) |
|---|---|---|---|
| Blue | 55-80 | 60 | 220-270 |
| Orange | 57-82 | 60 | 50-80 |
| Green | 70-95 | 60 | 120-190 |
| Brown | 54-79 | 60 | 30-80 |
| Slate | 61-86 | 60 | 0-360 |
| White | 78-98 | 60 | 0-360 |
| Red | 46-71 | 60 | 330-50 |
| Black | 0-10 | 60 | 0-360 |
| Yellow | 73-98 | 60 | 70-120 |
| Violet | 60-85 | 60 | 260-330 |
| Rose | 59-84 | 60 | 0-25 |
| Aqua | 67-92 | 60 | 180-230 |

TABLE 2

Contrast Ratio of Secondary Matrix as tested according to ASTM 2805

| Material | Film thickness (microns) | Contrast Ratio ($C_w$) |
|---|---|---|
| White Primary | 20-300 | 0.2-0.7 |
| Black Ink | 20-300 | 0.8-0.98 |
| Yellow Ink | 20-300 | 0.5-0.7 |
| Secondary Color | | |
| Blue | 20-300 | 0.5-0.7 |
| Orange | 20-300 | 0.3-0.6 |
| Green | 20-300 | 0.3-0.7 |
| Brown | 20-300 | 0.3-0.6 |
| Slate | 20-300 | 0.3-0.5 |
| White | 20-300 | 0.2-0.7 |
| Red | 20-300 | 0.5-0.8 |
| Black | 20-300 | 0.5-0.8 |
| Yellow | 20-300 | 0.5-0.8 |
| Violet | 20-300 | 0.5-0.8 |
| Rose | 20-300 | 0.6-0.9 |
| Aqua | 20-300 | 0.5-0.8 |

As shown in the embodiment of FIG. 3, the secondary matrix 16 has a thickness T2 of from 5 μm to 50 μm. In particular, reference to thickness T2 is to the thickness of the middle section of the optical fiber ribbon 10, which comprises most of the width of the optical fiber ribbon 10 except for the end regions. In this regard, as can be seen in the embodiment of FIG. 2, the optical fiber ribbon 10 has a "dog-bone" structure in which the primary matrix 14 is thicker at the end regions. In these regions, the thickness T2 of the secondary matrix 16 may reduce to approximately 0 μm. Taking as an example a blue secondary matrix 16 of 30 μm thickness, the composition of the secondary matrix 16 is selected to achieve a contrast ratio of no more than 0.7 as provided in Table 2 so as to maintain legibility of the underlying printing. However, in order to clearly discern the blue color of the ribbon 10, the composition of the secondary matrix 16 is selected to achieve a contrast ratio of at least 0.5 as provided in Table 2. It is noted that the example of a blue secondary matrix 16 was given, but performance of a contrast ratio measurement according to ASTM 2805 is the same for every color. That is, ASTM 2805 does not define different testing procedures on the basis of color analyzed.

In embodiments, the composition of the secondary matrix 16 is a pigment based color dispersion. In embodiments, the pigments are dispersed in a base resin, such as the embodiments of the base resin described above with respect to the primary matrix 14. A variety of pigments are suitable for use in the pigment-based color dispersion. An exemplary black pigment includes carbon black. Exemplary white pigments include $TiO_2$, $BaSO_4$, ZnO or ZnS. Exemplary yellow pigments include diarylide yellow and diazo-based pigments. Exemplary blue pigments include phthalocyanine blue, basic dye pigments, and phthalocyanines. Exemplary red pigments include anthraquinone (red), napthole red, monoazo-based pigments, quinacridone pigments, anthraquinone, and perylenes. Exemplary green pigments include phthalocyanine green and nitroso-based pigments. Exemplary orange pigments include monoazo- and diazo-based pigments, quinacridone pigments, anthraquinones and perylenes. Exemplary violet pigments include quinacrinode violet, basic dye pigments and carbazole dioxazine based pigments. The colors of aqua, brown, gray, and rose can be formulated by combining the pigments of the other colors listed above.

Thus, with reference to the exemplary embodiment shown in FIG. 4, disclosed herein is an optical fiber ribbon 10 in which the color of the ribbon 10 from the secondary matrix 16 can clearly be seen and in which the printing 18 along the ribbon 10 can be clearly discerned. These advantages are achieved, in part, by separating the functions of opacity and color between the primary matrix 14 and the secondary matrix 16, respectively. In particular, the use of a primary matrix 14 containing opacifier pigments masks the colors of the optical fibers 12, especially the darker colors, within the ribbon 10 and provides a contrasting background for reading of the printing 18 along the optical fiber ribbon 10. Further, the secondary matrix 16 provides an identification coloring between multiple ribbons 10 within an optical fiber cable while also protecting the underlying printing 18 from being scuffed or marred during installation. Notwithstanding, the color of the individual optical fibers 12 is still able to be discerned through the primary matrix 14 and the secondary matrix 16 without rendering the printing 18 illegible. As such, the optical fiber ribbon 10 according to the disclosure allows for the complementary use of several different means of identification to be used together on a single ribbon.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber ribbon, comprising:

a plurality of optical fibers arranged in a row;

a primary matrix into which the plurality of optical fibers are embedded, wherein the primary matrix comprises a base resin and an opacifier pigment;

a secondary matrix disposed around the primary matrix;

a layer of printing disposed between the primary matrix and the secondary matrix;

wherein the secondary matrix has a contrast ratio of from 0.2 to 0.9 as measured according to ASTM D2805.

2. The optical fiber ribbon of claim 1, wherein the primary matrix is white.

3. The optical fiber ribbon of claim 2, wherein the opacifier pigment is at least one of $TiO_2$, $BaSO_4$, ZnO or ZnS.

4. The optical fiber ribbon of claim 1, wherein the primary matrix is black.

5. The optical fiber ribbon of claim 4, wherein the layer of printing comprises dots of yellow ink or white ink.

6. The optical fiber ribbon of claim 1, wherein the primary matrix is gray.

7. The optical fiber ribbon of claim 6, wherein the opacifier pigment comprises a combination of at least one of $TiO_2$, $BaSO_4$, ZnO or ZnS and carbon black.

8. The optical fiber ribbon of claim 1, wherein the secondary matrix is blue with a hue angle of 220 to 270 according to CIE L*c*h* and wherein the secondary matrix comprises a contrast ratio of 0.5 to 0.7 according to ASTM D2805.

9. The optical fiber ribbon of claim 1, wherein, according to CIE L*c*h*, the secondary matrix is orange with a hue angle of 50 to 80 or brown with a hue angle of 30 to 80 and wherein the secondary matrix comprises a contrast ratio of 0.3 to 0.6 according to ASTM D2805.

10. The optical fiber ribbon of claim 1, wherein the secondary matrix is green with a hue angle of 120 to 190 according to CIE L*c*h* and wherein the secondary matrix comprises a contrast ratio of 0.3 to 0.7 according to ASTM D2805.

11. The optical fiber ribbon of claim 1, wherein the secondary matrix is slate with a hue angle of 0 to 360 according to CIE L*c*h* and wherein the secondary matrix comprises a contrast ratio of 0.3 to 0.5 according to ASTM D2805.

12. The optical fiber ribbon of claim 1, wherein the secondary matrix is white with a hue angle of 0 to 360 according to CIE L*c*h* and wherein the secondary matrix comprises a contrast ratio of 0.2 to 0.7 according to ASTM D2805.

13. The optical fiber ribbon of claim 1, wherein, according to CIE L*c*h*, the secondary matrix is red with a hue angle of 46 to 71, black with a hue angle of from 0 to 360, yellow with a hue angle of 73 to 98, violet with a hue angle of 60 to 85, or aqua with a hue angle of 67 to 92 and wherein the secondary matrix comprises a contrast ratio of 0.5 to 0.8 according to ASTM D2805.

14. The optical fiber ribbon of claim 1, wherein the secondary matrix is rose with a hue angle of 59-84 according to CIE L*c*h* and wherein the secondary matrix comprises a contrast ratio of 0.6 to 0.9 according to ASTM D2805.

15. The optical fiber ribbon of claim 1, wherein an average minimum thickness between a surface of an optical fiber of the plurality of the optical fibers and an outer surface of the primary matrix is from 5 μm to 15 μm.

16. The optical fiber ribbon of claim 1, wherein a thickness of the secondary matrix is from 5 μm to 50 μm.

17. The optical fiber ribbon of claim 1, wherein the plurality of optical fibers is at least four optical fibers and wherein each optical fiber has a longitudinal axis that is coplanar with the other optical fibers in the row.

18. A method of preparing an optical fiber ribbon, comprising the steps of:

arranging a plurality of optical fibers in a row;

embedding the plurality of optical fibers into a primary matrix, wherein the primary matrix comprises a base resin and an opacifier pigment;

printing information regarding characteristics of the optical fiber ribbon onto the primary matrix; and coating the primary matrix with a secondary matrix, wherein the secondary matrix comprises a contrast ratio of from 0.2 to 0.9 as measured according to ASTM D2805.

19. The method of claim 18, comprising the step of selecting the secondary matrix to be blue with a hue angle of 220 to 270 according to CIE L*c*h* and wherein the secondary matrix comprises a contrast ratio of 0.5 to 0.7 according to ASTM D2805.

20. The method of claim 18, comprising the step of selecting, according to CIE L*c*h*, the secondary matrix to be orange with a hue angle of 50 to 80 or brown with a hue angle of 30 to 80 and wherein the secondary matrix comprises a contrast ratio of 0.3 to 0.6 according to ASTM D2805.

* * * * *